US011436838B2

(12) United States Patent
Niewiadomski et al.

(10) Patent No.: US 11,436,838 B2
(45) Date of Patent: Sep. 6, 2022

(54) SYSTEM AND METHOD FOR DETECTING TRAILER CORNERING LIMITS FOR FIFTH-WHEEL TRAILER ARRANGEMENTS (71) Applicant: Ford Global Technologies, LLC, Dearborn, MI (US)

(72) Inventors: Luke Niewiadomski, Dearborn, MI (US); Phillip Curtiss Couture, Waterford, MI (US); Li Xu, Northville, MI (US); Alexander Lee Hunton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/083,402

(22) Filed: Oct. 29, 2020

(65) Prior Publication Data

US 2022/0138476 A1 May 5, 2022

(51) Int. Cl.
| | |
|---|---|
| *G06V 20/56* | (2022.01) |
| *G06T 7/20* | (2017.01) |
| *H04N 5/232* | (2006.01) |
| *B60R 11/04* | (2006.01) |
| *G06T 7/70* | (2017.01) |

(52) U.S. Cl.
CPC .............. *G06V 20/56* (2022.01); *B60R 11/04* (2013.01); *G06T 7/20* (2013.01); *G06T 7/70* (2017.01); *H04N 5/232* (2013.01); *G06T 2207/30252* (2013.01)

(58) Field of Classification Search
CPC ......... G06K 9/00791; G06T 7/70; G06T 7/20; G06T 2207/30252; B60R 11/04; H04N 5/232; G06V 20/56
See application file for complete search history.

(56) References Cited

U.S. PATENT DOCUMENTS

| 9,168,951 | B2 | 10/2015 | Chiu et al. |
| 9,493,187 | B2 * | 11/2016 | Pilutti ..................... B60D 1/62 |
| 9,499,200 | B2 | 11/2016 | Hochrein et al. |
| 10,118,611 | B2 * | 11/2018 | Chaney, Jr. ..... B60W 30/18036 |
| 2015/0085119 | A1 * | 3/2015 | Dagan ....................... G06T 7/20 348/148 |
| 2019/0210418 | A1 * | 7/2019 | Hall ....................... B60D 1/245 |
| 2020/0247471 | A1 * | 8/2020 | Grodde .................. G06V 20/58 |
| 2020/0294401 | A1 * | 9/2020 | Kerecsen ............. G05D 1/0287 |

FOREIGN PATENT DOCUMENTS

WO        2020079092 A1    4/2020

* cited by examiner

*Primary Examiner* — Md K Talukder
(74) *Attorney, Agent, or Firm* — Gregory P. Brown; Price Heneveld LLP (57) ABSTRACT A trailer detection system for a vehicle includes a trailer sensor, an imaging system, and a controller. The controller implements a trailer angle indication process including receiving and processing image data to identify a rotation point of a trailer coupled with the vehicle about a fifth-wheel hitch, left and right lateral edges of the trailer, and a distance between a rear portion of a cab of the vehicle and a front face of the trailer. Trailer yaw rate data is received and processed to determine an angle of the trailer about the rotation point, and an expected position of the front face of the trailer and at least one of the left and right lateral edges of the trailer with respect to the cab of the vehicle is calculated.

20 Claims, 9 Drawing Sheets

SYSTEM AND METHOD FOR DETECTING TRAILER CORNERING LIMITS FOR FIFTH-WHEEL TRAILER ARRANGEMENTS

FIELD OF THE DISCLOSURE

The present disclosure generally relates to a driver assistance system for a vehicle. In particular, the system identifies and tracks the features and relative angle of a fifth-wheel trailer being towed by the vehicle to detect potential contact between the trailer and a cab of the vehicle and deliver a corresponding indication to the driver.

BACKGROUND OF THE DISCLOSURE

When a vehicle, such as a pickup truck, tows a trailer connected by way of a fifth-wheel type hitch, there is a possibility that a portion of the trailer will be brought into contact with the rear portion of the vehicle cab during driving, particularly during maneuvers with tight turns resulting in a high relative angle between the trailer and vehicle about the hitch ("the hitch angle"). In general, the receiver in a fifth-wheel hitch arrangement is mounted directly over the rear axle of the vehicle, for example, within the bed of a pickup truck. When this arrangement is used in a vehicle where the rear of the cab is relatively close to the rear axle and/or the mounting point for the receiver (e.g., as a truck with an "extended" cab and a "short" bed), the hitch angle $\gamma$ at which such contact may occur is lowered compared to other implementations. A number of solutions have been developed to avoid potential contact for higher hitch angles including adaptations to the geometry of the trailer face and various arrangements that move the rotation point rearward of the hitch coupling. Such modifications, however, do not eliminate the potential of contact between the trailer and the vehicle cab such that detection of the trailer position relative to the vehicle and a corresponding indication of such potential contact at an opportune time may still be desired.

SUMMARY OF THE DISCLOSURE

According to one aspect of the present disclosure, a trailer detection system for a vehicle includes a trailer sensor outputting trailer yaw rate data, an imaging system outputting image data obtained from an area to a rear of the vehicle, and a controller. The controller implements a trailer angle indication process including receiving the image data and processing the image data during movement of the vehicle to identify a rotation point of a trailer coupled with the vehicle about a fifth-wheel hitch within the image data, left and right lateral edges of the trailer, and a distance between a rear portion of a cab of the vehicle and a front face of the trailer. The process also includes receiving the trailer yaw rate data and processing the yaw rate data to determine an angle of the trailer relative to the vehicle about the rotation point on an ongoing basis, calculating an expected position of the front face of the trailer and at least one of the left and right lateral edges of the trailer with respect to the cab of the vehicle, and outputting an indication upon the expected position of either of the front face of the trailer or the at least one of the left and right lateral edges of the trailer is within a predetermined distance of the cab of the vehicle.

Embodiments of the first aspect of the invention can include any one or a combination of the following features:

- the imaging system includes a video camera mounted along an upper edge of the rear portion of the vehicle cab;
- the video camera is configured to output the image data as a digital signal;
- the system further includes a trailer electrical connection, and the controller monitors the trailer electrical connection for a connected state and either enables or disables the trailer indication process based on the connected state;
- the controller initially determines that the trailer is coupled with the vehicle about the fifth-wheel hitch based on one of trailer information stored in memory or a user input;
- the controller further determines a type of the fifth-wheel hitch about which the trailer is coupled based on the identification of the rotation point of the trailer;
- the controller calculates the expected position of the front face of the trailer based on geometry associated with the type of the fifth-wheel hitch;
- the type of the fifth-wheel hitch about which the trailer is coupled is identified as a sliding-type fifth-wheel hitch based on the rotation point being identified as moving;
- wherein identifying the rotation point of the trailer coupled with the vehicle about the fifth-wheel hitch within the image data further includes identifying the trailer as a gooseneck trailer and identifying the left and right lateral edges of the trailer as left and right sides of a gooseneck portion of the trailer;
- the system further includes a steering angle sensor and a vehicle switchgear, the controller further determines a potential contact interval based on the trailer yaw rate, a vehicle steering angle based on an input received from the steering angle sensor, and a vehicle direction inferred from a state of the vehicle switchgear, and the indication is further output upon the potential contact interval being below a predetermined threshold; and
- the indication is communicated at least one of audibly, visually, or haptically.

According to another aspect of the present disclosure, a vehicle includes a fifth-wheel hitch mounted to the vehicle, an imaging system outputting image data obtained from an area to a rear of the vehicle, and a controller configured to receive trailer yaw rate data from a sensor mounted on a trailer coupled with the vehicle about the fifth-wheel hitch. The controller further implements a trailer angle indication process including receiving the image data and processing the image data during movement of the vehicle to identify a rotation point of the trailer within the image data, left and right lateral edges of the trailer, and a distance between a rear portion of a cab of the vehicle and a front face of the trailer, receiving the trailer yaw rate data and processing the yaw rate data to determine an angle of the trailer relative to the vehicle about the rotation point on an ongoing basis, calculating an expected position of the front face of the trailer and at least one of the left and right lateral edges of the trailer with respect to the cab of the vehicle, and outputting an indication upon the expected position of either of the front face of the trailer or the at least one of the left and right lateral edges of the trailer is within a predetermined distance of the cab of the vehicle.

According to another aspect of the present disclosure, a method for monitoring a trailer connected with a vehicle about a fifth-wheel hitch includes receiving image data from an imaging system outputting image data obtained from an area to a rear of the vehicle and processing the image data during movement of the vehicle to identify a rotation point of the trailer within the image data, left and right lateral edges of the trailer, and a distance between a rear portion of a cab of the vehicle and a front face of the trailer. The method further includes receiving trailer yaw rate data from a trailer sensor and processing the yaw rate data to determine an angle of the trailer relative to the vehicle about the rotation point on an ongoing basis, calculating an expected position of the front face of the trailer and at least one of the left and right lateral edges of the trailer with respect to the cab of the vehicle, and outputting an indication upon the expected position of either of the front face of the trailer or the at least one of the left and right lateral edges of the trailer is within a predetermined distance of the cab of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
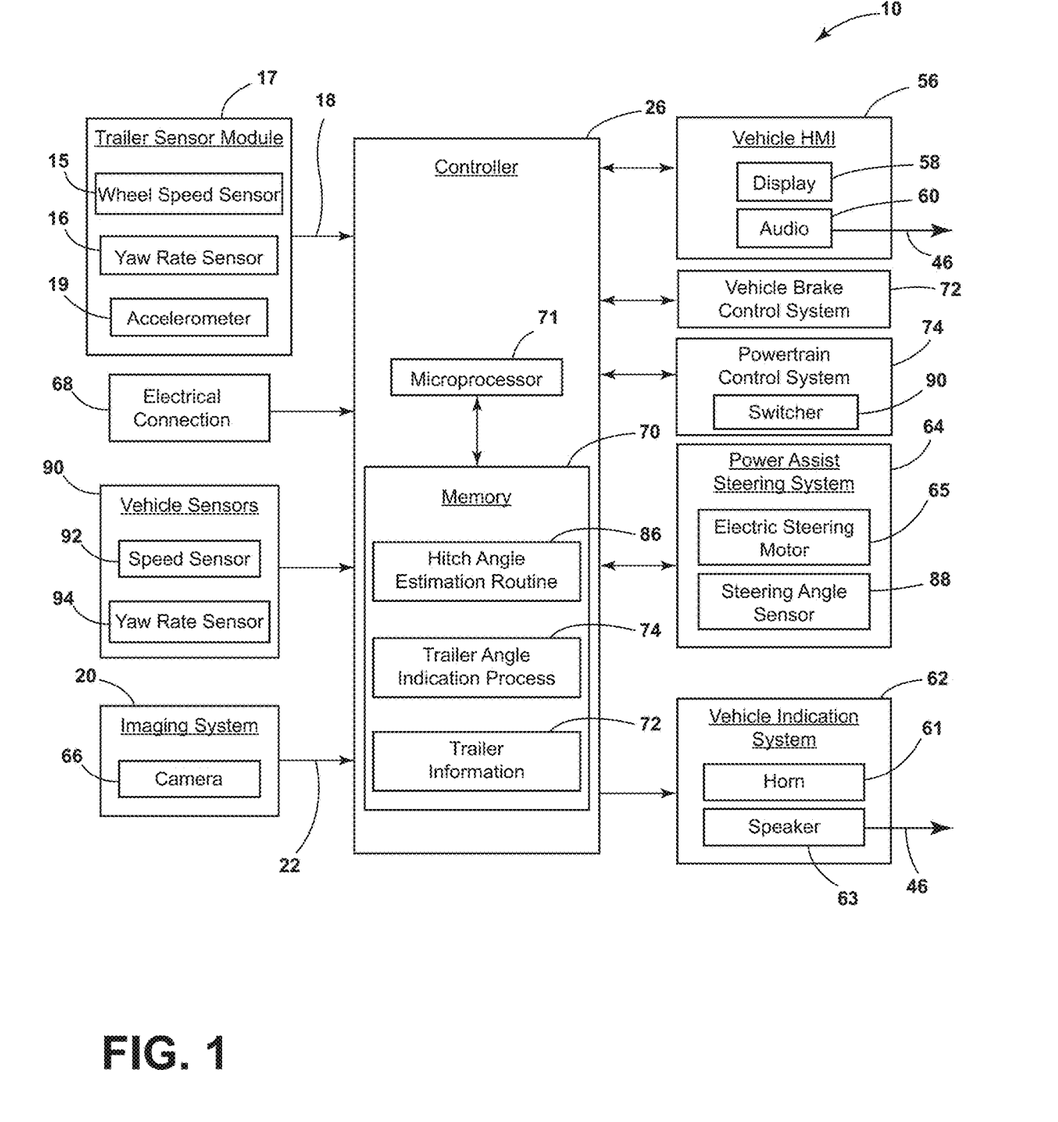
FIG. 1 is a schematic depiction of a system according to the present disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-5, reference numeral 10 generally designates a trailer detection system for a vehicle 12. System 10 includes a trailer sensor (e.g., in the form of yaw rate sensor 16) outputting trailer yaw rate data 18, an imaging system 20 outputting image data 22 obtained from an area to a rear of the vehicle 12 (such as within the field of view 24 depicted in FIG. 2), and a controller 26. The controller 26 implements a trailer angle indication process 27 including receiving the image data 22 and processing the image data 22 during movement of the vehicle 12 to identify a rotation point 28 of a trailer 14 coupled with the vehicle 12 about a fifth-wheel hitch 30 within the image data 22, left and right lateral edges 36a, 36b of the trailer 14, and a distance A-D (FIG. 4) between a rear portion 40 of a cab 42 of the vehicle 12 and a front face 44 of the trailer 14. The process 27 also includes receiving the trailer yaw rate data 18 and processing the yaw rate data 18 to determine an angle γ of the trailer 14 relative to the vehicle 12 about the rotation point 28 on an ongoing basis, calculating an expected position of the front face 44 of the trailer and at least one of the left and right lateral edges 36a, 36b of the trailer 14 with respect to the cab 42 of the vehicle 12 (based on the angle γ of the trailer 14 relative to the vehicle 12), and outputting an indication 46 upon the expected position of either of the front face 44 of the trailer 14 or the at least one of the left and right lateral edges 36a, 36b of the trailer 14 is within a predetermined distance of the cab 42 of the vehicle 12.

Figure 2:
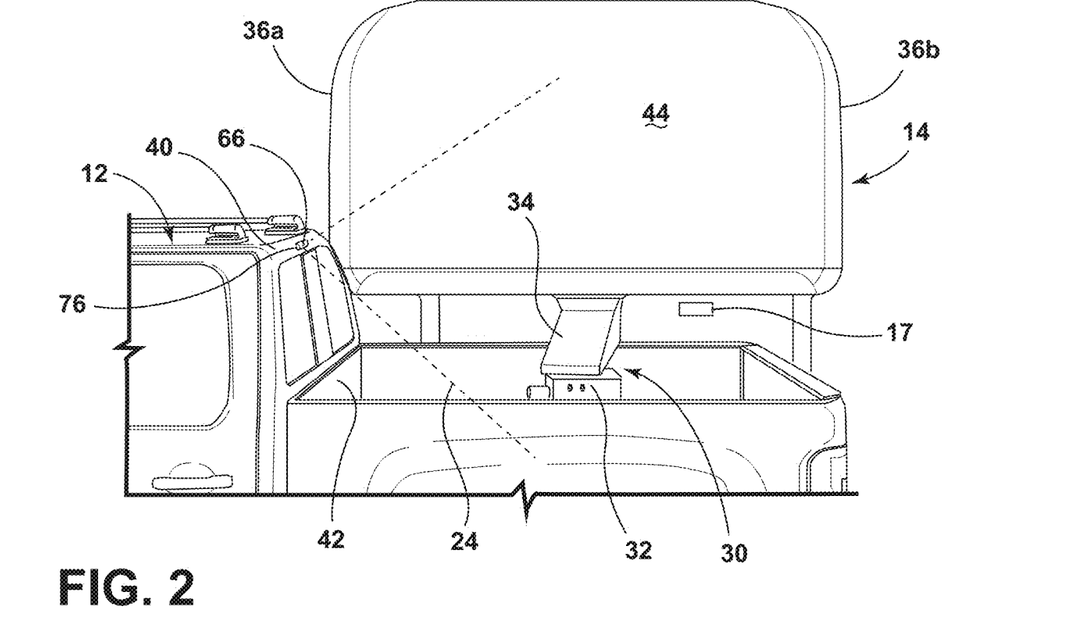
FIG. 2 is a depiction of a vehicle with a trailer coupled therewith about a fifth-wheel type hitch connection and including the system of FIG. 1.

With continued reference to FIG. 2, it can be seen that, when a vehicle 12, such as the depicted pickup truck, tows a trailer 14 connected by way of a fifth-wheel type hitch 30 (which includes a receiver 32 fixed with the vehicle 12 and a kingpin 34 fixedly connected with the trailer 14), there is a possibility that a portion of the trailer 14 will be brought into contact with, for example, the rear portion 40 of the vehicle cab 42 during driving, particularly during maneuvers with tight turns resulting in a high hitch angle γ. In general, the receiver 32 in a fifth-wheel hitch 30 arrangement is mounted directly over the rear axle 48 of the vehicle 12, for example, within the bed 50 of a pickup truck. When this arrangement is used in a vehicle 12 where the rear portion 40 of the cab 42 is relatively close to the rear axle 48 and/or the mounting point for the receiver 32 (e.g., as a truck with an "extended" cab 42 and a "short" bed 50, as in the example of FIG. 1), the hitch angle γ at which such contact may occur is lowered compared to other vehicle and fifth-wheel configurations. As can be appreciated, in addition to the distance between the rear portion 40 of the cab 42 and the receiver 32, a number of other factors can influence the hitch angle γ that can be reached before any potential contact between the trailer 14 and the cab 42. In particular, the width of the trailer 14, measured as the distance between the center D (FIGS. 4 and 5) of the front face 44 of the trailer 14 and the respective edges 36a and 36b, can affect whether the edges 36a, 36b would contact the cab 42 at a point along the rear portion 40 (FIG. 5) or if the face 44 of the trailer 14 could contact the cab 42 at one of the corners C (FIG. 4) such that the positions of the edges 36a and 36b are to be determined for appropriate potential contact indications, as discussed further below.

Figure 3:
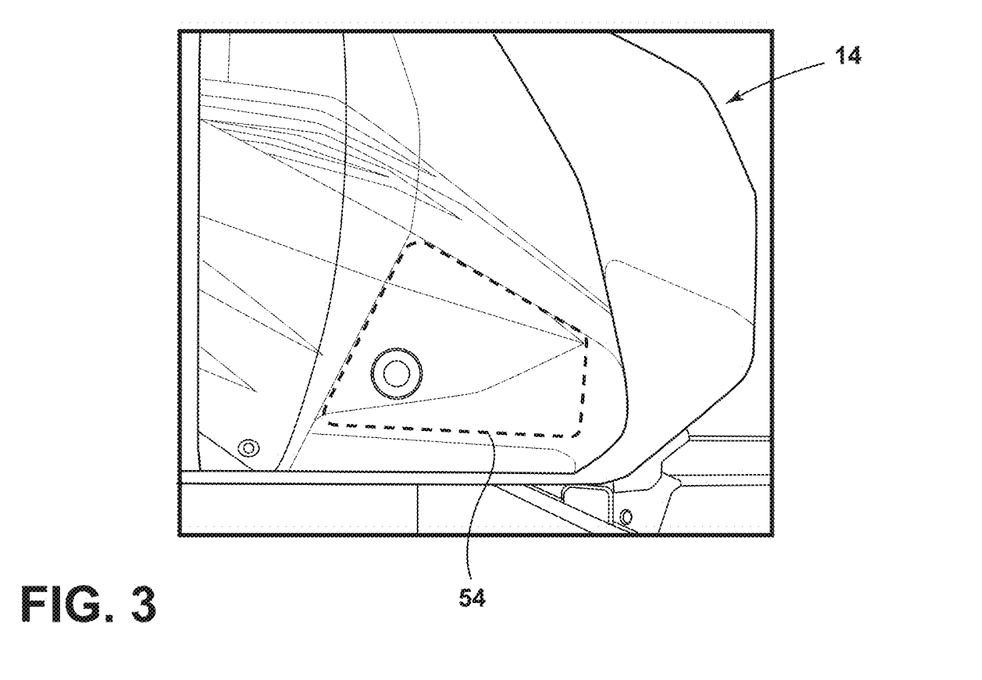
FIG. 3 is a depiction of a fifth-wheel type trailer having adjusted trailer face geometry to accommodate higher relative hitch angles.
Figure 12:
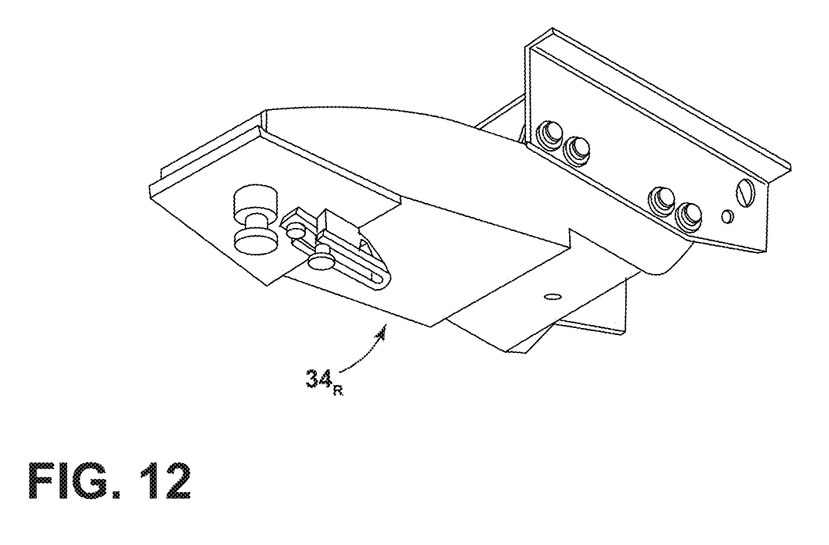
FIG. 12 is a perspective depiction of a kingpin body with a rotating turret configuration.
Figure 13:
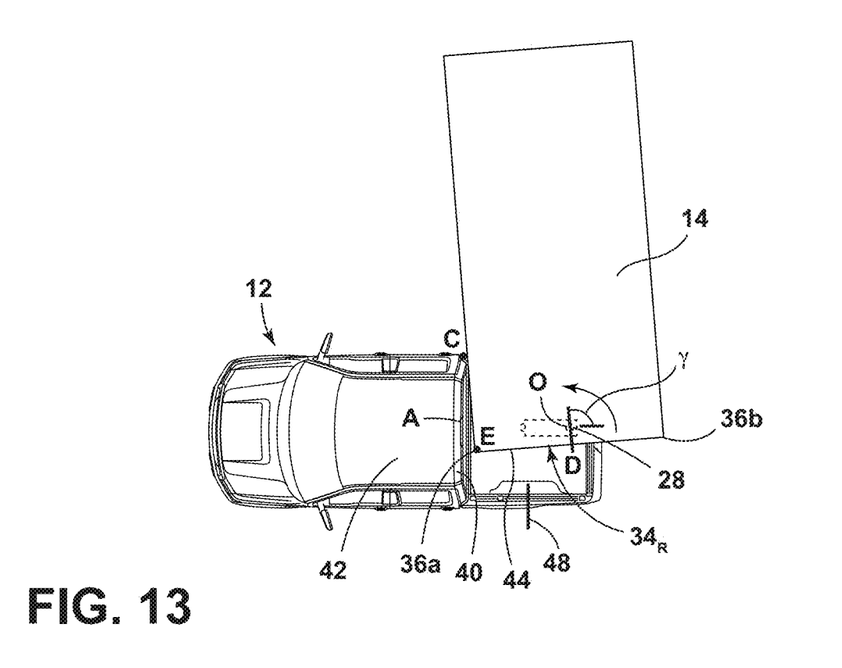
FIG. 13 is an overhead view of a vehicle towing a trailer with a rotating turret kingpin body in a fifth-wheel hitching arrangement therewith and depicting a contact position of the trailer with respect to the vehicle.

Further, a number of solutions have been developed to allow for higher hitch angles γ, in avoiding potential contact, for vehicles 12 towing trailers 14 using fifth-wheel type hitches 30. In particular, as shown in FIG. 3, the face 44 of the trailer 14 can be pointed or otherwise include side cutouts 52. In other solutions, the hitch 30 may be modified to, effectively, move the rotation point 28 rearward, to give more space between the rotation point 28 and the cab 42 to accommodate trailer 14 rotation. As shown in FIGS. 7-11, in one example the receiver 32s can be mounted to the vehicle 12 in a sliding arrangement that facilitates rearward movement of the rotation point 28. In some aspects, the sliding arrangement can be manual, allowing the driver to selectively lock the mechanism with the rotation point 28 aligned with the rear axle 48 during, for example, regular towing, or to unlock the mechanism to allow the rotation point 28 to move rearward when tight maneuvers with a high hitch angle γ are anticipated. In other applications, the sliding mechanism may be automatic, with rearward movement of the rotation point 28" (and movement back forward) coordinated with rotation of the trailer (including such that the rearward movement only occurs after a certain predetermined hitch angle γ). Still further, as shown in FIGS. 12 and 13, a kingpin $34_R$ can be used that locks in a straight position with respect to the receiver 32 but is rotatably connected with the trailer 14 such that the rotation point 28 occurs at the (more rearward) connection point between the kingpin 34 and the trailer 14 instead of at the interface between the receiver 32 and the kingpin 34. As discussed, below, the present system 10 is configured to account for such variations in trailer 14 geometry and rotation point 28 placement and/or movement to provide a reliable indication of potential contact between the vehicle 12 and trailer 14, while allowing the driver to make relatively tighter movements, as allowed by the relevant geometry.

To provide sufficient indication of a potential contact between the trailer 14 and the vehicle 12, within the variety of scenarios discussed above, system 10 uses multiple sensing technologies to detect the position of trailer 14, including the various subject features thereof, relative to the vehicle 12 and performs a predictive assessment of the chance of contact, including during tight cornering scenarios. As discussed above, if a potential contact is detected, an indication, including, for example, a multi-modal indication, is issued to the driver to allow the driver to stop, make control adjustments, or both to the vehicle 12 to prevent such contact. In various aspects, system 10 can issue such an indication 46 by way of a vehicle human-machine interface 56, including visually on a display 58 thereof. Additionally, an audible indication can be given by way of speakers included or in communication with an audio component 60 of the HMI or by way of the general vehicle indication system 62 (such as by way of horn 61 or speaker 63). Still further, a haptic indication can be delivered through the vehicle steering system 64, or the like, for example by causing the electric steering motor 65 to vibrate the vehicle steering wheel.

With general reference to the flowchart depicted in FIG. 6, along with the additional figures discussed below, the operation of system 10 is discussed, with the flowchart depicting an embodiment of the process 27 carried out by controller 26 and/or a general method for use by system 10 in detecting and responding to a potential contact between the trailer 14 and vehicle 12. In this manner, all numbered steps discussed are with reference to FIG. 6, unless specifically stated otherwise. As shown, system 10 only implements this functionality when vehicle 12 is determined to be coupled with and/or actively towing a trailer 14. In one implementation, after activation (step 112, which can include vehicle ignition) the vehicle 12 can make a determination that the vehicle 12 is towing a trailer 14 by monitoring a status of a trailer electrical connection 68 (step 114) such that, when the connection 68 is observed to be in a connected state, it is inferred that a trailer 14 is connected to the connection 68 and, thus, with vehicle 12. Conversely, if the connection 68 is not observed to be in a connected state, the vehicle 12 is assumed to not be in a towing state or to otherwise have a trailer 14 coupled therewith. Additionally, upon activation, system 10 determines if a standard (i.e. coupled with a hitch on the rear of the vehicle 12) or a fifth-wheel type trailer 14 is connected with vehicle 12. In one aspect, the system 10 can make this determination by user selection of a trailer from a list of trailers for which various characteristics (e.g., length, hitch type, etc.) of such trailers stored in memory 70 are accessible by system 10 (step 116). As illustrated in FIG. 1, system 10 can include the above-described controller 26 with such memory 70 that can include such trailer information 72 as well as the above-mentioned trailer angle indication process 27. In various examples, the controller 26 can be associated with a vehicle advanced driver assistance system ("ADAS") by way of such system including its own controller (which can, for example, include a dedicated microprocessor, application-specific integrated circuit, system-on chip, or the like) or that is connected with a general vehicle on-board computing system (with a controller of a similar configuration to those listed formerly). If the trailer is not associated with information 72 in memory 70, the user can add new trailer information, including the type of trailer (fifth-wheel, including a kingpin or gooseneck connection, or conventional). In further examples, controller 26 can perform in initial image processing on the data 22 from imaging system 20 to identify a trailer 14 and the type of connection with vehicle 12 (steps 120-128), which can be confirmed with the user via HMI 56.

When a trailer 14 is determined to be connected with the vehicle 12 and the type of connection is either input to or identified by system 10, additional parameters are determined by system 10. These parameters include the rotation point 28 of trailer 14 relative to vehicle 12 (step 122) and the particular fifth-wheel hitch type 30 (step 124), as discussed above, the width of the trailer 14 (measured from the center point D to the respective edges 36a, 36b (point E in FIGS. 4 and 5)) along the face 44 thereof (step 126). System 10 also determines the distance 38 between the rear portion 40 of cab 42 and the face 44 of the trailer 14 (step 128). System 10 automatically determines the above parameters using vision processing of the image data 22, as discussed further below. Once the parameters are determined, they can be stored as part of the trailer profile such that they are available for future usages of the system immediately at activation (noting that some of the parameters, such as the rotation point 28 in certain trailer configuration, can be updated during continued towing of trailer 14 with vehicle 12). To facilitate the above-described vision processing, the imaging system 20 includes a camera 66 mounted on vehicle 12 in a position to capture the fifth-wheel hitch 30 and enough of the face 44 of the trailer 14 to locate edges 36a and 36b of trailer 14, at least through an extent of regular driving to determine the trailer 14 width E-D. In this respect, the camera 66 may be incorporated into a center high-mount stop light ("CHMSL") array 76 positioned along the rear edge 40 of the cab 42 (particularly when vehicle 12 is in the form of the depicted pickup truck) and generally aligned with the center A of vehicle 12 and typically includes one or more break lights, as well as bed lights or backup lights. Even further, camera 66 can be a digital camera configured for transmitting the image data 22 as a digital signal, by either a wired or wireless connection, to controller 26.

Figure 4:
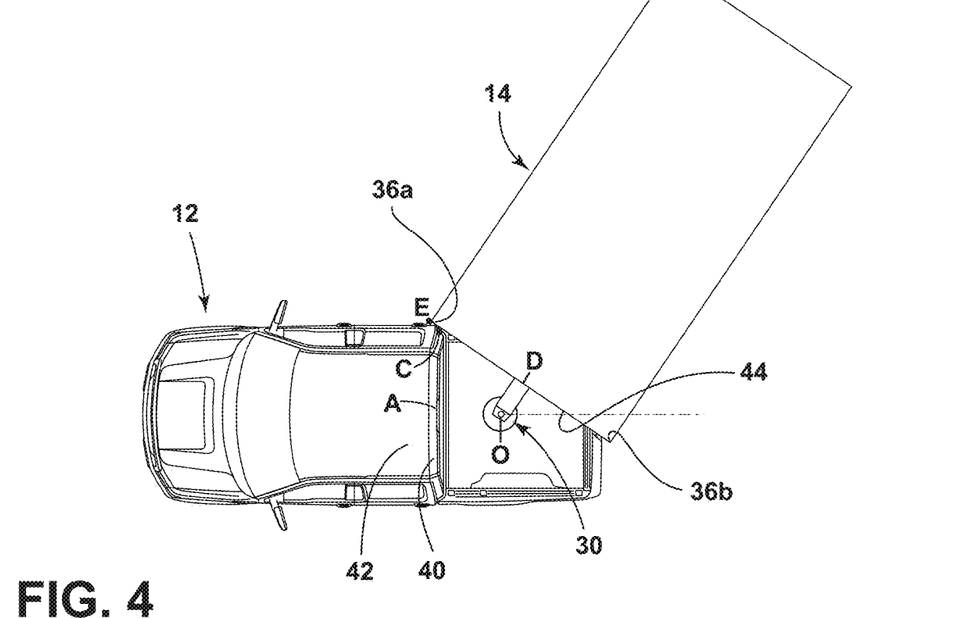
FIG. 4 is an overhead depiction of a trailer contacting a portion of the towing vehicle cab during a turning maneuver in a first arrangement.
Figure 5:
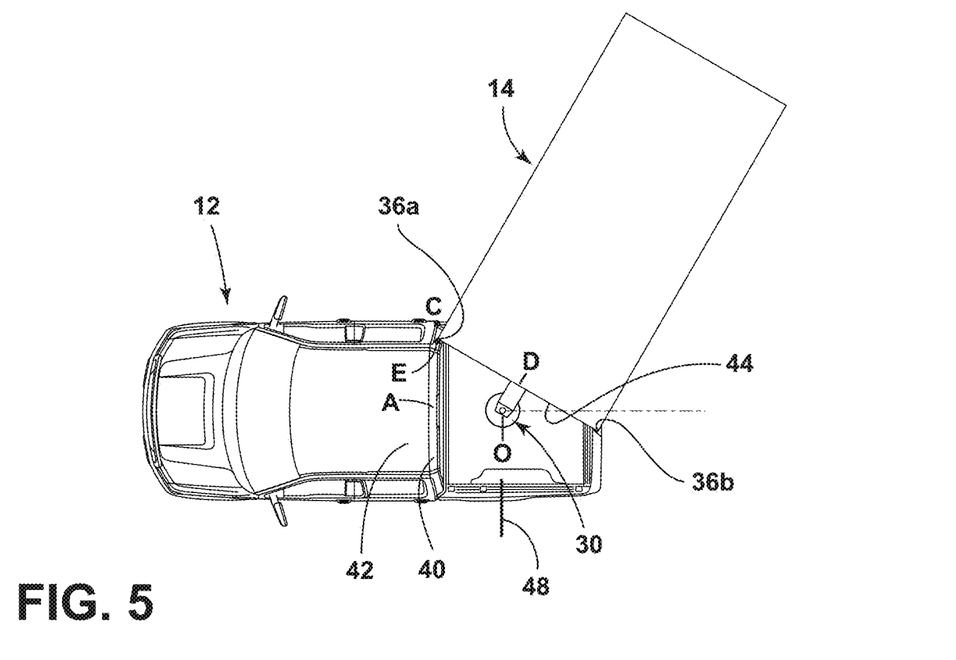
FIG. 5 is an overhead depiction of a trailer contacting a portion of the towing vehicle cab during a turning maneuver in a second arrangement.
Figure 6:
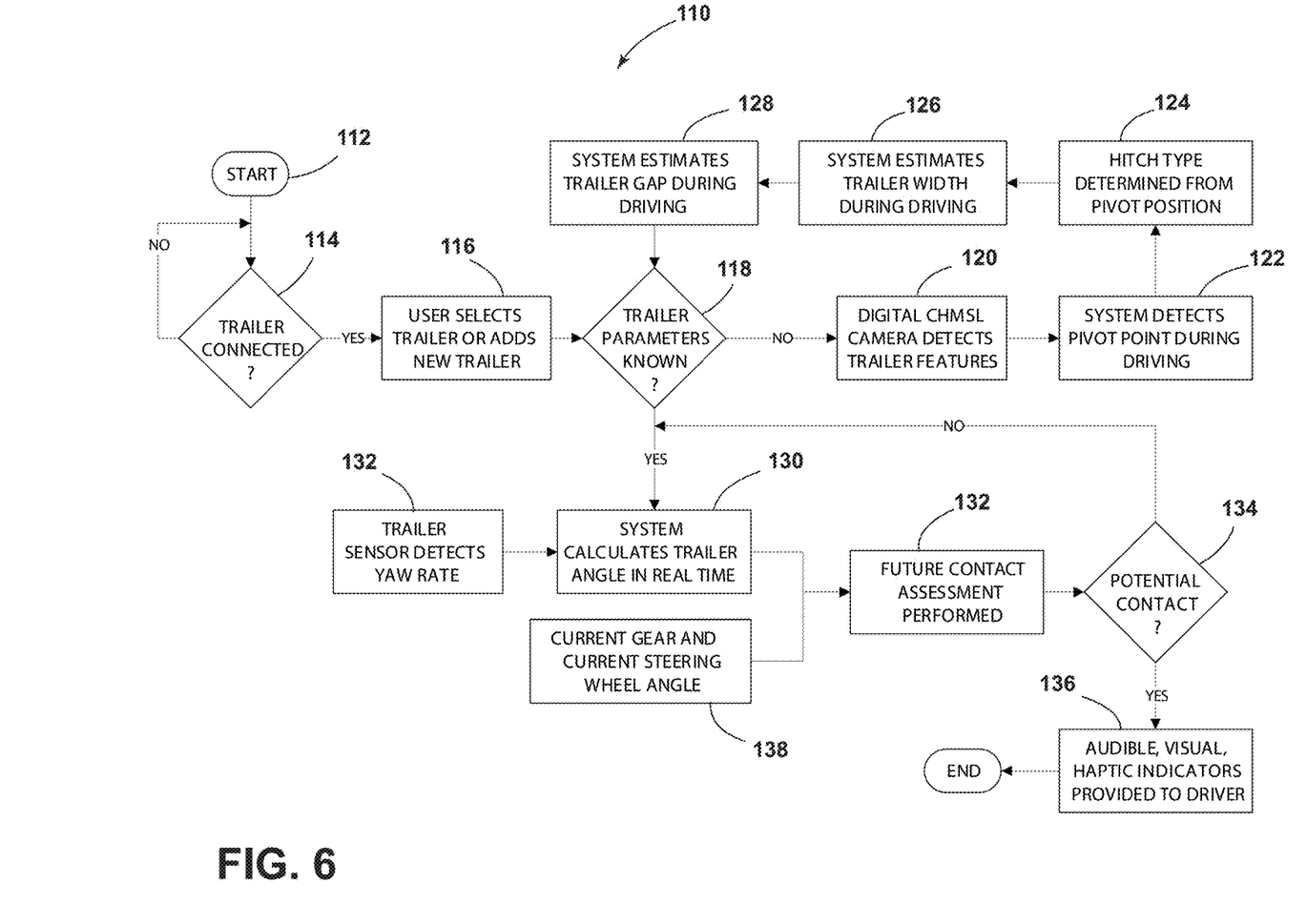
FIG. 6 is flowchart depicting steps in a trailer angle indication process implemented by the system of FIG. 1.
Figure 7:
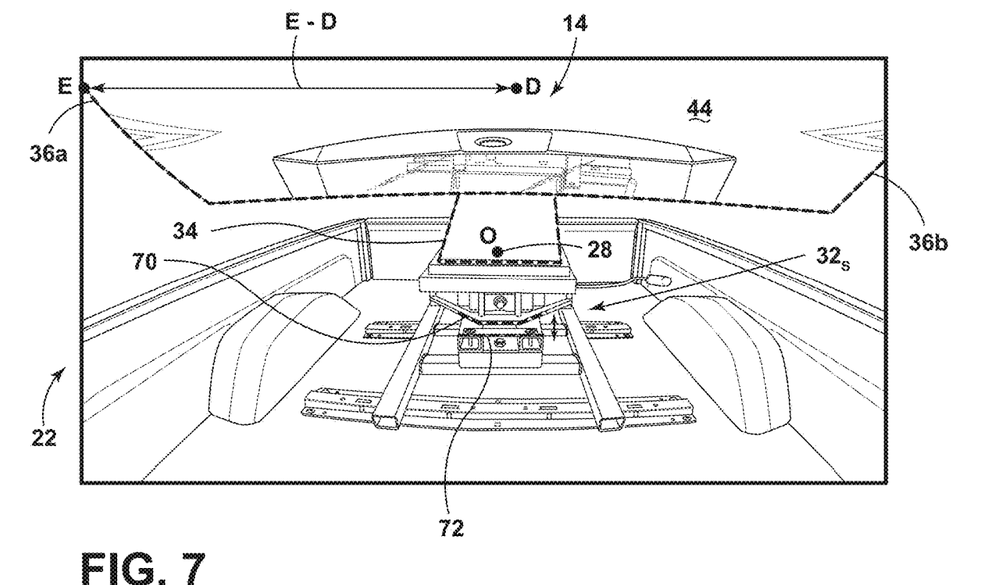
FIG. 7 is an illustration of image data processed by the system of FIG. 1 to determine the location of various trailer and fifth-wheel hitch features relative to the towing vehicle.
Figure 8:
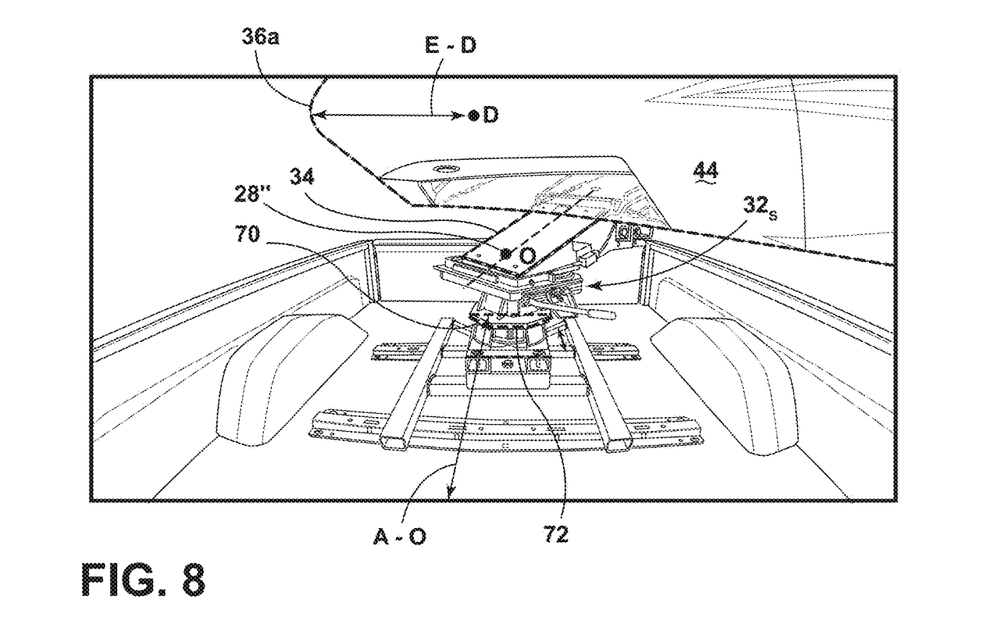
FIG. 8 is an illustration of further image data processed by the system of FIG. 1 to continue to determine the location of various trailer and fifth-wheel hitch features relative to the towing vehicle.

As indicated in step 122 in FIG. 6, controller 26 can first determine the rotation point 28 of the trailer 14 about the fifth-wheel hitch 30. As shown in the example of FIGS. 7 and 8, the rotation point 28 can be deduced using on point tracking of features, including the kingpin body 34, the base 72 of the receiver 32, and any mount 78 thereof, during a vehicle turn. In the illustrated example of a sliding type receiver 32s, such that the rotation point 28 can be located with respect to the receiver 32s body 74 by determining the center of rotation for the kingpin body 34. Controller 26 can confirm rearward movement (as is present between the trailer 14 positions in FIGS. 7 and 8) by determining that the receiver body 74 moves with respect to mount 78, as indicated by the increase in distance between the detected leading edges thereof, respectively. Once the rotation point 28 has been established, including a determination of such rotation point 28 being fixed or moving (point 28" in FIGS. 8 and 10), system 10 can determine the hitch type using the rotation point 28. In particular, if the rotation point 28 is fixed above the rear axle (which is known and stored in memory 70), the fifth-wheel hitch 30 can be determined to be a standard hitch, including a standard receiver 32 and a standard kingpin 34, as shown in FIGS. 2-5. If the rotation point 28 is determined to be located on the trailer 14 (including behind the face 44) and behind the axle 48 of vehicle 12, the hitch 30 can be determined to include a "rotating turret" type kingpin $34_R$, as shown in FIGS. 12 and 13, wherein the kingpin body 34 is rotatable with respect to the trailer 14. As discussed above, if the rotation point 28 is determined to move (e.g., to point 28") during turning, the hitch 30 is determined to include a sliding receiver body 32s, as discussed above and illustrated in FIGS. 7, 8, 10, and 11.

Figure 14:
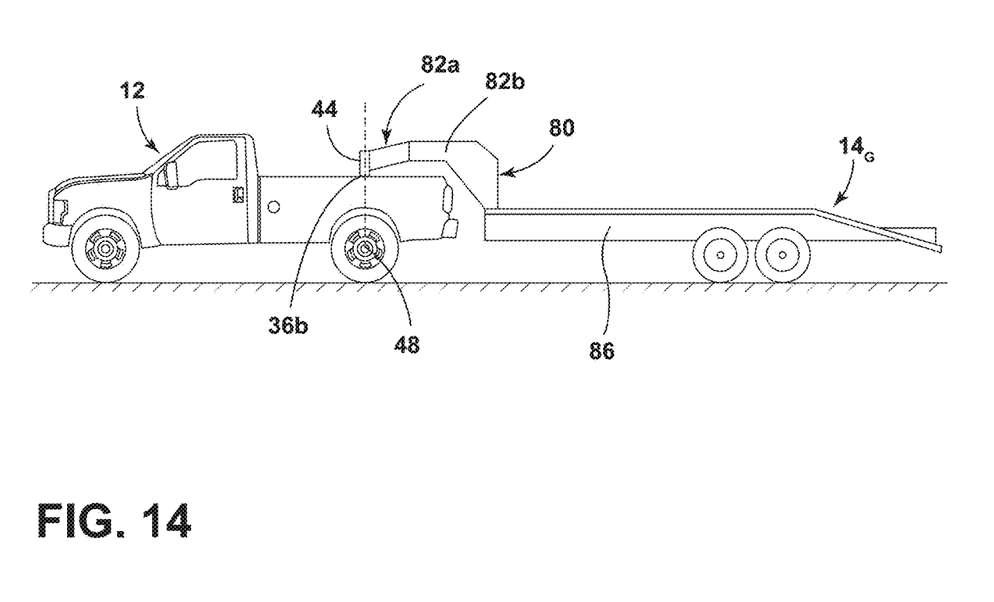
FIG. 14 is a side view of a vehicle coupled with a gooseneck trailer in a fifth-wheel hitching arrangement.

Once the trailer type has been determined (in step 124), the system 10 detects the side edges 36a, 36b of the face 44 of the trailer 14 and monitors their position within the image data 22 during normal driving (when the trailer 14 is present). Geometric analysis of the image data 22 by controller 26 allows for an acceptably accurate estimation of the trailer width E-D (step 126) by tracking the movement of the trailer edges 36a, 36b relative to the vehicle 12 during turning of the vehicle 12 and trailer 14 combination (to locate point E on each side). Subsequently, the distance A-D between the trailer face 44 and the cab 42 is determined (step 128). In one aspect, distance A-D can be estimated using similar techniques to the trailer width, including by tracking various identified features of the trailer 14 during turning. In a particular embodiment, system 10 can be further, optionally, configured to monitor the position of a gooseneck trailer 14g, as shown in FIG. 14 and to monitor for potential contact with a portion of vehicle 12 during cornering. In one aspect, controller 26 can be configured to look for the edges 36a, 36b of the narrower face 44 of the gooseneck trailer $14_G$ (defined on the "gooseneck" 80) and to infer that the edges 36a and 36b correspond with the sides 82a and 82b of the gooseneck 80 and to, in addition to the hitch type identification in step 124 can determine, based on the narrow face 44, for example, that a gooseneck trailer $14_G$ is present. Upon such a determination, system 10 can monitor for a potential contact between the gooseneck 80 and the rear portion 40 of the cab 42 using camera 66, as discussed above. Additionally, system 10 can use an additional camera 84 that is in a position to observe the body 86 of the gooseneck trailer $14_G$ (such as by being positioned on the rear of vehicle 12) to monitor for the potential of contact between the body 86 and another portion of vehicle 12 using similar techniques to those discussed above.

Once the above geometric data is collected, controller 26 can use the geometry to determine a hitch angle $\gamma_{max}$ at which the trailer 14 would likely contact the cab 42 of the vehicle 12. A situation involving a fixed, standard fifth-wheel hitch 30 is shown in FIGS. 4 and 5, where A-O, A-C, D-O and E-D are known, fixed distances. As discussed above, the trailer width E-D affects the point of potential contact and, thus the maximum hitch angle $\gamma_{max}$, which is derived as follows:

$$CO = \sqrt{AO^2 + AE^2} ; \quad (1)$$

$$CD = \sqrt{CO^2 - DO^2} ; \quad (2)$$

If $ED \geq CD$:

$$\angle AOC = \tan^{-1}\frac{AC}{AO}; \quad (3)$$

$$\angle EOD = \cos^{-1}\frac{DO}{CO}; \text{ and} \quad (4)$$

$$\gamma_{max} = 180 - \angle AOC - \angle EOD; \quad (5)$$

If $ED < CD$:

$$EO = \sqrt{ED^2 + DO^2} ; \quad (6)$$

$$AE = \sqrt{EO^2 - AO^2} ; \quad (7)$$

$$\angle AOE = \sin^{-1}\frac{AE}{EO}; \quad (8)$$

$$\angle EOD = \tan^{-1}\frac{ED}{DO}; \text{ and} \quad (9)$$

$$\gamma_{max} = 180 - \angle AOE - \angle EOD \quad (10)$$

Figure 9:
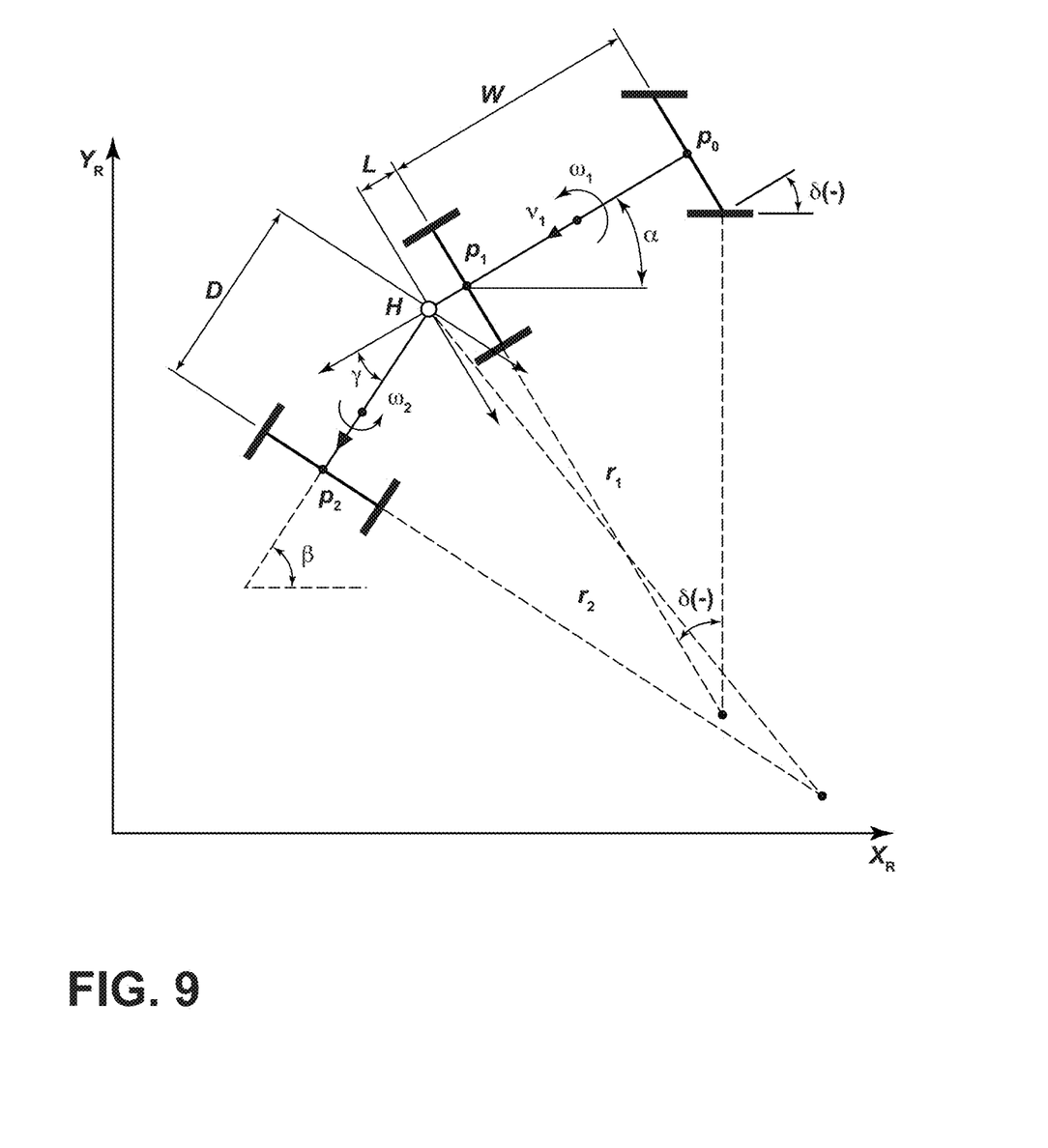
FIG. 9 is a schematic depiction of a vehicle-trailer kinematic model used by the system to determine the relative angle of the trailer relative to the vehicle using trailer yaw rate data.

Controller 26 then runs a hitch angle routine 86 to determine the current hitch angle γ on an ongoing basis (step 130 in FIG. 6). As mentioned above, the hitch angle routine 86 uses the trailer yaw rate data 18 obtained from yaw rate sensor 16 (which may be included in a trailer sensor module 17 mounted on trailer 14 and including or being in communication with other sensors, such as a trailer speed sensor 15 and an accelerometer 19) to determine the hitch angle γ in light of the kinematic relationship between the vehicle 12 and trailer 14 depicted in FIG. 9, with the drawbar distance L being zero due to the determined rotation point 28 being located above the vehicle rear axle 48. In particular, the kinematic relationship between the trailer 14 and the vehicle 12 is developed with the illustrated schematic diagram that shows the geometry of a vehicle 12 and a trailer 14 overlaid with a two-dimensional x-y coordinate system, identifying variables, such as the trailer yaw rate $\omega_2$ and the vehicle yaw rate cot, which are used to determine the corresponding hitch angle γ. As such, hitch angle estimation may be determined using trailer yaw rate signal $\omega_2$, along with a vehicle speed signal vi and a vehicle yaw rate signal $\omega_1$ (both of which can be obtained from a vehicle sensor system 90 including a vehicle speed sensor 92 and a vehicle yaw rate sensor 16). The process for determining the hitch angle γ using the trailer yaw rate $\omega_2$ is discussed in greater detail in commonly-assigned U.S. Pat. No. 9,493,187, the entire contents of which are hereby incorporated by reference herein. Specifically, the yaw rate of the trailer is given by the following kinematic equation:

$$\omega_2 = \frac{v_1}{D}\sin\gamma - \frac{L}{D}\cos\gamma\omega_1 \quad (11)$$

This kinematic equation can be rearranged to estimate trailer hitch angle γ, as follows:

$$\gamma = \sin^{-1}\frac{v_1\omega_2 D + \omega_1 L\sqrt{v_1^2 + \omega_1^2 L^2 - \omega_2^2 D^2}}{v_1^2 + \omega_1^2 L^2} \text{ or } \gamma = \sin^{-1}\frac{\omega_2 D}{\sqrt{v_1^2 + \omega_1^2 L^2}} + \tan^{-1}\frac{\omega_1 L}{v_1} \quad (12)$$

Accordingly, with L being equal to zero, controller 26 can use the vehicle yaw rate signal 18 to determine the hitch angle γ (step 130), which is then compared with the appropriate determination of the maximum hitch angle $\gamma_{max}$ to determine if contact is likely to occur (step 132). In one embodiment, it may be possible to simply set a threshold hitch angle $\gamma_t$ at a predetermined interval below the maximum hitch angle $\gamma_{max}$ at which the potential contact indication is issued to the driver (step 136). In various examples, the threshold hitch angle $\gamma_t$ can be between 1° and 5°. In a further embodiment, system 10 can use additional factors to determine if the measured hitch angle γ actually corresponds with a potential contact. In particular, the measured hitch angle γ can be used along with a measurement of the vehicle steering angle δ received from steering angle sensor 88 within vehicle steering system 64, an inferred travel direction (i.e. forward or reverse) based on the state of the vehicle switchgear 90 (i.e. in drive, or reverse, respectively) can be evaluated (step 138) in light of the determined maximum steering angle $\gamma_{max}$ to determine an instantaneous estimate for a time to contact, should the vehicle speed and steering angle δ remain constant. In such an embodiment, a threshold time to contact can be set such that the contact indication is given when a potential contact interval, based on the time to contact, is determined to be at or below the threshold time, which can be between about 1 and 4 seconds, for example. It is to be understood that such a time interval will correspond with a particular hitch angle γ, but will be enacted such that the hitch angle upon which the contact indication will vary depending on the other described parameters. In some embodiments, multiple levels of indication and/or intervention may be present, such that, for example, controller 26 can present an initial indication at a first threshold, such as about 3 seconds from contact, and can intervene, such as by activating the vehicle brakes 94 at a second threshold, such as about 1 second, for example, with a second indication that the intervention being presented notifying the driver of the intervention being given at that time.

Figure 10:
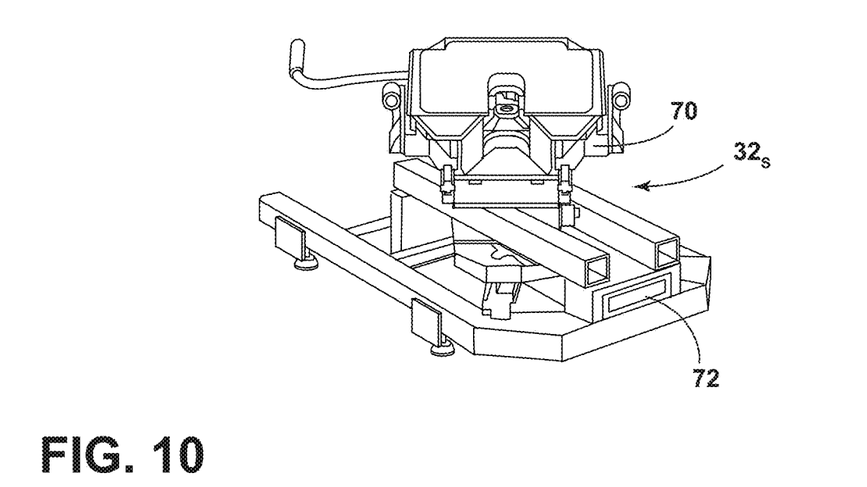
FIG. 10 is a perspective depiction of one implementation of a sliding receiver useable in a fifth-wheel hitch arrangement.
Figure 11:
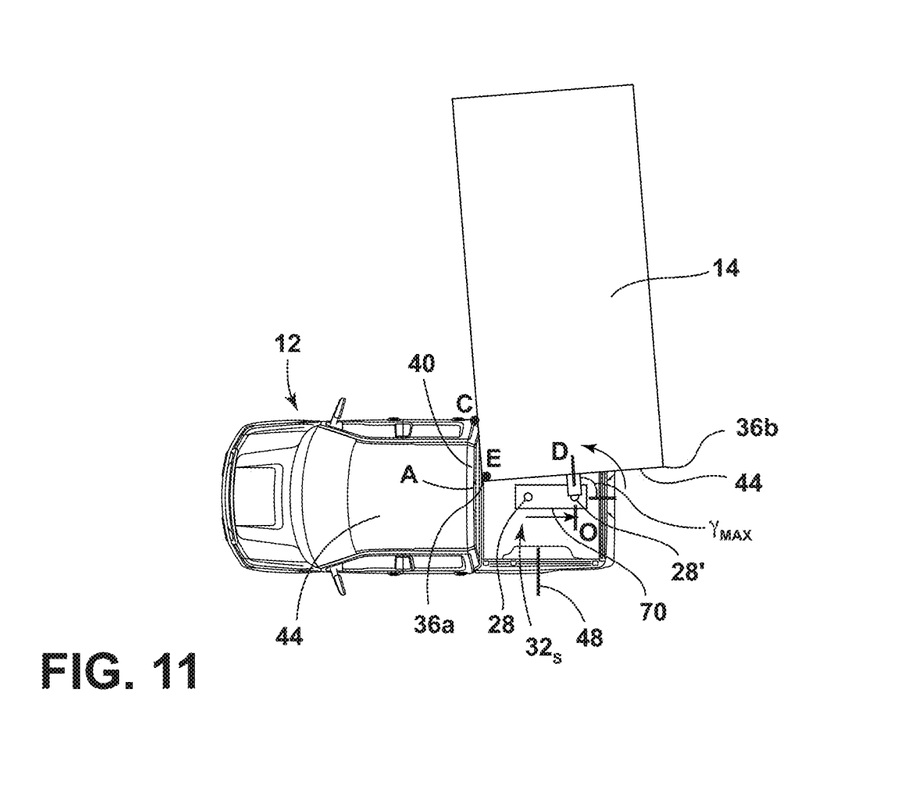
FIG. 11 is an overhead view of a vehicle with a sliding receiver towing a trailer in a fifth-wheel hitching arrangement therewith and depicting a contact position of the trailer with respect to the vehicle.

With reference to FIG. 10, the above-described process is generally the same with a sliding type hitch receiver 32s, as illustrated. Because the pivot point moves, however, the above calculations for both the maximum hitch angle $\gamma_{max}$ (equations 1-10) and the instantaneous hitch angle determination (equations 11 and 12, as implemented by controller 26 running hitch angle routine 86) are adjusted to account for the movement of the rotation point 28. In particular, the determination for the maximum hitch angle $\gamma_{max}$ can be run continuously, during vehicle turning, to determine either the maximum value for A-O that the rotation point 28 movement allows or to update the determination for the maximum hitch angle $\gamma_{max}$ as the rotation point 28 moves rearward. Additionally, the detected rotation point 28 can be compared to the location of the rear vehicle axle 48 during execution of the hitch angle routine 86 to update the drawbar length L on an ongoing basis, as this measurement affects the hitch angle γ derived using the trailer yaw rate $\omega_2$. In the case of a rotating turret type kingpin 34r, as shown in FIGS. 12 and 13, similar calculations are used as in the case of a standard fifth-wheel hitch 30, but with the corresponding, greater distance A-O, resulting from the more rearward, fixed rotation point 28, used. Additionally, the rotation point 28 can be compared with the rear vehicle axle 48 location to derive the fixed, nonzero value for L used in the hitch angle routine 86.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A trailer detection system for a vehicle, comprising:
a trailer sensor outputting trailer yaw rate data;
an imaging system outputting image data obtained from an area to a rear of the vehicle; and
a controller implementing a trailer angle indication process including:
receiving the image data and processing the image data during movement of the vehicle to identify a rotation point of a trailer coupled with the vehicle about a fifth-wheel hitch, mounted above a rear axle of the vehicle, within the image data, left and right lateral edges of the trailer, and a distance between a rear portion of a cab of the vehicle, disposed forward of the rear axle of the vehicle, and a front face of the trailer disposed between the rear portion of the cab of the vehicle and a rear of the vehicle;
receiving the trailer yaw rate data and processing the yaw rate data to determine an angle of the trailer relative to the vehicle about the rotation point on an ongoing basis;
calculating an expected position of the front face of the trailer and at least one of the left and right lateral edges of the trailer with respect to the cab of the vehicle; and
outputting an indication upon the expected position of either of the front face of the trailer or the at least one of the left and right lateral edges of the trailer is within a predetermined distance of the cab of the vehicle.

2. The system of claim 1, wherein the imaging system includes a camera mounted along the rear portion of the vehicle cab.

3. The system of claim 2, wherein the camera is configured to output the image data as a digital signal.

4. The system of claim 1, further including a trailer electrical connection, wherein:
the controller monitors the trailer electrical connection for a connected state and either enables or disables the trailer angle indication process based on the connected state.

5. The system of claim 1, wherein the controller initially determines that the trailer is coupled with the vehicle about the fifth-wheel hitch based on one of trailer information stored in memory or a user input.

6. The system of claim 1, wherein the controller further determines a type of the fifth-wheel hitch about which the trailer is coupled based on identification of the rotation point of the trailer.

7. The system of claim 6, wherein the controller determines the expected position of the front face of the trailer based on geometry associated with the type of the fifth-wheel hitch.

8. The system of claim 6, wherein the type of fifth-wheel hitch about which the trailer is coupled is identified as a sliding-type of fifth-wheel hitch based on the rotation point being identified as moving toward and away from the vehicle cab with respect to the rear axle.

9. The system of claim 1, wherein identifying the rotation point of the trailer coupled with the vehicle about the fifth-wheel hitch within the image data further includes identifying the trailer as a gooseneck trailer and identifying the left and right lateral edges of the trailer as left and right sides of a gooseneck portion of the trailer.

10. The system of claim 1, further including a steering angle sensor and a vehicle switchgear, wherein:
the controller further determines a potential contact time interval based on the trailer yaw rate data, a vehicle steering angle based on an input received from the steering angle sensor, and a vehicle direction inferred from a state of the vehicle switchgear; and
the indication is further output upon the potential contact interval time being below a predetermined threshold.

11. The system of claim 1, wherein the indication is issued at least one of audibly, visually, or haptically.

12. A vehicle, comprising:
a fifth-wheel hitch mounted to the vehicle;
an imaging system outputting image data obtained from an area to a rear of the vehicle; and
a controller configured to receive trailer yaw rate data from a sensor mounted on a trailer coupled with the vehicle about the fifth-wheel hitch and implementing a trailer angle indication process including:
receiving the image data and processing the image data during movement of the vehicle to identify a rotation point of the trailer within the image data, left and right lateral edges of the trailer, and a distance between a rear portion of a cab of the vehicle and a front face of the trailer;
receiving the trailer yaw rate data and processing the yaw rate data to determine an angle of the trailer relative to the vehicle about the rotation point on an ongoing basis;
calculating an expected position of the front face of the trailer and at least one of the left and right lateral edges of the trailer with respect to the cab of the vehicle corresponding with a potential contact time interval; and
outputting an indication upon the expected position of either of the front face of the trailer or the at least one of the left and right lateral edges of the trailer is within a predetermined distance of the cab of the vehicle within the potential contact time interval.

13. The vehicle of claim 12, wherein the imaging system includes a camera mounted along an upper edge of the rear portion of the vehicle cab, the camera being configured to output the image data as a digital signal.

14. The vehicle of claim 12, wherein the controller initially determines that the trailer is coupled with the vehicle about the fifth-wheel hitch based on one of trailer information stored in memory or a user input.

15. The vehicle of claim 12, wherein the controller further determines a type of the fifth-wheel hitch about which the trailer is coupled based on identification of the rotation point of the trailer.

16. The vehicle of claim 15, wherein the controller determines the expected position of the front face of the trailer based on geometry associated with the type of the fifth-wheel hitch.

17. The vehicle of claim 15, wherein the type of fifth-wheel hitch about which the trailer is coupled is identified as a sliding-type fifth-wheel hitch based on the rotation point being identified as moving.

18. The vehicle of claim 12, wherein the trailer angle detection process further includes identifying the trailer as a gooseneck trailer and identifying left and right lateral edges of the trailer as left and right sides of a gooseneck portion of the trailer.

19. The vehicle of claim 12, further including a steering angle sensor and a vehicle switchgear, wherein:
the controller further determines the potential contact time interval based on the trailer yaw rate, a vehicle steering angle based on an input received from the steering angle sensor, and a vehicle direction inferred from a state of the vehicle switchgear; and
the indication is further output upon the potential contact time interval being below a predetermined time threshold.

20. A method for monitoring a trailer connected with a vehicle about a fifth-wheel hitch, comprising:
receiving image data from an imaging system outputting the image data obtained from an area to a rear of the vehicle and processing the image data during movement of the vehicle to identify a rotation point of the trailer within the image data, left and right lateral edges of the trailer, and a distance between a rear portion of a cab of the vehicle and a front face of the trailer, the cab of the vehicle being disposed forward of a rear axle of the vehicle, and the front face of the trailer being disposed between the rear portion of the cab of the vehicle and a rear of the vehicle by way of the fifth-wheel hitch being positioned over the rear axle;
receiving trailer yaw rate data from a trailer sensor and processing the yaw rate data to determine an angle of the trailer relative to the vehicle about the rotation point on an ongoing basis;
calculating an expected position of the front face of the trailer and at least one of the left and right lateral edges of the trailer with respect to the cab of the vehicle; and
outputting an indication upon the expected position of either of the front face of the trailer or the at least one of the left and right lateral edges of the trailer is within a predetermined distance of the cab of the vehicle.

* * * * *